Oct. 23, 1956 F. W. SIDE 2,768,359
VARIABLE INDUCTOR
Filed Dec. 22, 1951 3 Sheets-Sheet 1

*INVENTOR.*
FREDERICK W. SIDE
BY Arthur H. Swanson
ATTORNEY.

Oct. 23, 1956 F. W. SIDE 2,768,359
VARIABLE INDUCTOR
Filed Dec. 22, 1951 3 Sheets-Sheet 2

INVENTOR.
FREDERICK W. SIDE
BY
ATTORNEY.

Oct. 23, 1956  F. W. SIDE  2,768,359
VARIABLE INDUCTOR

Filed Dec. 22, 1951  3 Sheets-Sheet 3

*INVENTOR.*
FREDERICK W. SIDE
BY
Arthur H. Swanson
ATTORNEY.

United States Patent Office 2,768,359
Patented Oct. 23, 1956

2,768,359

VARIABLE INDUCTOR

Frederick W. Side, Philadelphia, Pa., assignor to Minneapolis-Honeywell Regulator Company, Minneapolis, Minn., a corporation of Delaware Application December 22, 1951, Serial No. 262,991

17 Claims. (Cl. 336—30)

The general object of the present invention is to provide a simple, effective, and novel converter of the inductance or variable reluctance type for use in modulating a small direct current, such as a thermocouple current, thereby to produce an alternating current proportional to the direct current and of suitable frequency.

More specifically, the object of the invention is to provide a D. C.-A. C. converter of the inductance or variable reluctance type which is adapted for use, with a relatively high conversion frequency, in a manner similar or analogous to that in which a D. C.-A. C. converter of the vibrating contact type is successfully employed, with a relatively low conversion frequency, in self-balancing measuring apparatus of the type disclosed in the Wills Patent 2,423,540 of July 8, 1947. My improved converter of the present invention is well adapted for use with a conversion frequency, such as 400 cycles per second, which is substantially higher than the conversion frequency of 60 cycles per second customarily employed with the vibrating contact converter used in self-balancing measuring and control apparatus of the type disclosed in said Wills patent.

The novel converter of the present invention is of a type especially suitable for use in aircraft provided with a source of alternating current having the relatively high frequency of 400 cycles or so per second. This suitability is due to the ability of the converter to operate effectively at that frequency to provide an alternating current output signal of suitable strength for use in self-balancing apparatus of the character disclosed in said Wills patent. For such use, my novel converter has a definite advantage over a converter of the vibrating contact type, in that it is not subject to the relatively high and objectionable contact wear or abrasion to which a vibratory contact type of converter is subjected when operating at a frequency of the order of 400 cycles per second.

My novel converter, in the form which I now prefer, comprises a driver element including a diaphragm vibrated at the desired frequency by electro-magnetic means including an energizing coil connected to a source of alternating current of suitable frequency, and also comprises a modulator element including a solenoid winding connected across a source of a small D. C. voltage and an armature connected to and reciprocated by the vibrating driver element diaphragm. Said armature is arranged alternately to increase and decrease the strength of the magnetic field created by the solenoid, and thereby generates an alternating voltage of the desired frequency in the circuit including the solenoid winding and the source of D. C. voltage.

A practical and important specific object of the invention is to provide a converter of the type described which is of relatively simple and compact form and is characterized by the effective use of high mumetal in the electro-magnetic portions of the converter, and by the converter shielding provisions provided to minimize the undesirable effects of stray voltages.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 1:
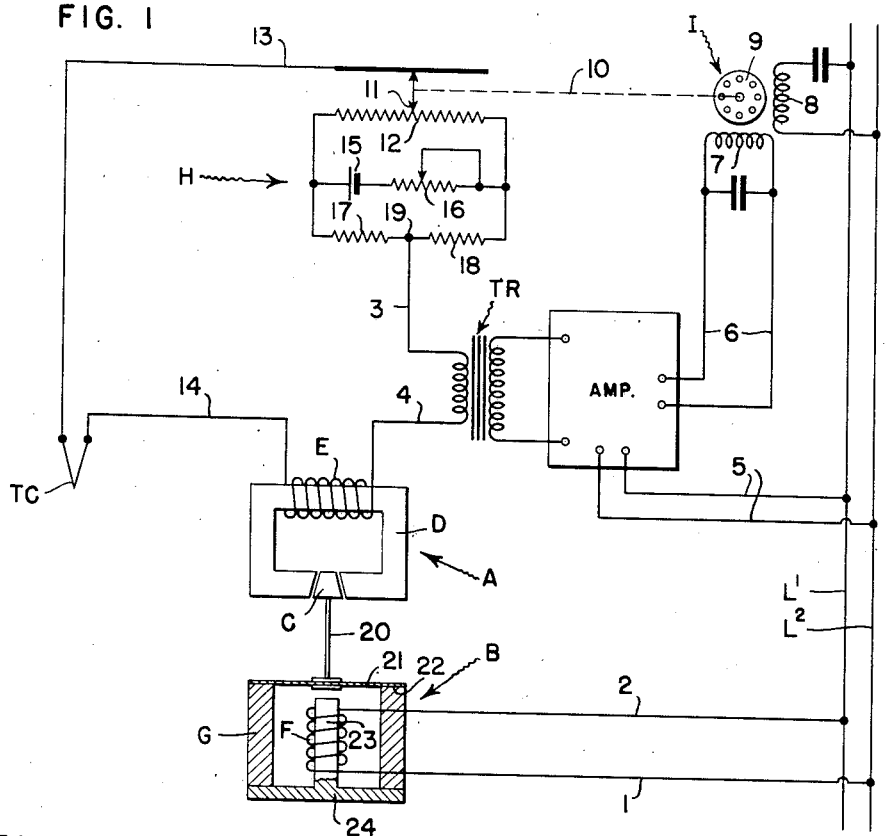
Fig. 1 is a diagrammatic illustration of a desirable embodiment of the present invention.

In the desirable embodiment of the invention illustrated diagrammatically in Fig. 1, A designates a modulator unit and B designates an electromagnetic driver unit included in an inductance converter. The unit B vibrates an armature C relative to the pole piece structure D of the modulator A. The vibration of the armature C modulates a small unidirectional voltage impressed on the terminals of a coil E which is in inductive relation with the pole structure D, and thereby generates an alternating current flow in a circuit including the coil E and a source of small unidirectional voltage. The frequency of the alternating current in the coil E is a function of the frequency of the alternating voltage impressed on a coil F which is inductively associated with the pole piece structure G of the driver unit B. As shown, the terminals 1 and 2 of the coil F are connected across alternating current supply conductors L' and L² supplying alternating current of suitable frequency, which may be assumed to be 400 cycles per second.

In the embodiment of the invention illustrated in Fig. 1, the circuit including the coil E includes, in series therewith, a thermocouple TC, a potentiometric measuring bridge circuit H, and the primary winding conductors 3 and 4 of a transformer TR which has its secondary winding connected to the input conductors of an electronic amplifier designated AMP. The latter has energizing terminals 5 connected across the supply conductors L' and L². The output terminals 6 of the amplifier are connected across the control winding 7 of a reversible alternating current motor I. A suitable condenser is connected across the winding 7. The motor I also has a power winding 8 connected across the alternating current supply conductors L' and L² in series with a suitable condenser.

Also included in the motor I is a rotor 9. On a change in the voltage of the thermocouple TC, the rotor 9 turns in one direction or the other depending upon the direction of thermocouple voltage change. The rotor 9, when rotating, operates through a mechanical connection 10 to adjust a wiper contact 11 along a slide wire resistor 12 included in the measuring circuit H. The contact 11 is connected at all times to one terminal conductor 13 of the thermocouple TC. The second terminal conductor 14 of the thermocouple is connected to one end terminal of the coil E, and the remaining end terminal of the latter is connected to the transformer terminal 4. The slide wire resistor 12 of the bridge circuit H is connected in series with an energizing circuit branch including a dry cell 15, or other source of current, and an adjustable resistance 16 connected in series therewith. The circuit H includes a third branch comprising resistors 17 and 18 connected in series with one another to the terminals of the slide wire resistor 12 and to the terminals of the circuit branch including the elements 15 and 16. The transformer terminal 3 is connected to the junction 19 of the resistors 17 and 18.

In the balanced condition of the apparatus shown in Fig. 1, the position of the contact 11 along the slide wire 12 is such that the potential difference between the points 11 and 19 of the bridge circuit H is equal in magnitude and opposite in polarity to the potential difference between the thermocouple terminals 13 and 14. When the measuring system is so balanced, there is no current flow through the coil E. When the voltage of the thermocouple increases or decreases, the measuring circuit becomes unbalanced, and current is caused to flow through the thermocouple TC and the coil E. The modulator A then acts to make the signal current then impressed on the amplifier AMP through the transformer TR an alternating current of a magnitude proportional to the thermocouple voltage change and of a frequency which is a function of the frequency of the current supplied by the conductors L' and L². The alternating current signal impressed on the amplifier is of one phase or of the opposite phase, depending upon the direction of the change in the thermocouple voltage, and thus causes the rotor 9 of the motor I to rotate in one direction or in the opposite direction. With either direction of change of the thermocouple voltage, the motor I operates to adjust the wiper contact 11 along the slide wire resistor 12 in the direction needed to rebalance the measuring circuit and thus reduce the current flow through the coil E to zero.

Except in respect to the character of the converter including the modulator A and driver B, the apparatus shown in Fig. 1 operates to balance the measuring circuit and thus prevent current flow through the thermocouple TC in a manner, and by the use of apparatus of the character, disclosed in the above mentioned Wills patent. The apparatus disclosed in the Wills patent has been in extensive public use in this country for several years, and further description of the measuring and rebalancing apparatus shown in Fig. 1 and hereinbefore described therefore appears to be unnecessary.

The modulating action of the modulator A results from the vibration of the armature C and the resultant alternate increase and decrease in the air gap between the portions of the pole structure D at opposite sides of the armature C. The armature C is connected by a shaft element 20 to a vibrating element 21. The latter may be a ferrous metal disc, or diaphragm, secured at its periphery to the annular rim portion 22 of the pole piece structure G. The energizing winding F of the unit B surrounds a central pole portion 23 of the structure G. The upper end of the pole portion 23 is spaced a small distance away from the diaphragm 21, and the latter has its central portion alternately attracted and repelled by the alternating electromagnetic flux in the magnetic circuit formed by the pole piece parts 22 and 23, the diaphragm 21, and the base portion 24 of the structure G. Preferably, the driver diaphragm 21 is polarized so that it vibrates with the frequency of the alternating current supplied to the coil F by the conductors L' and L².

Figure 2:
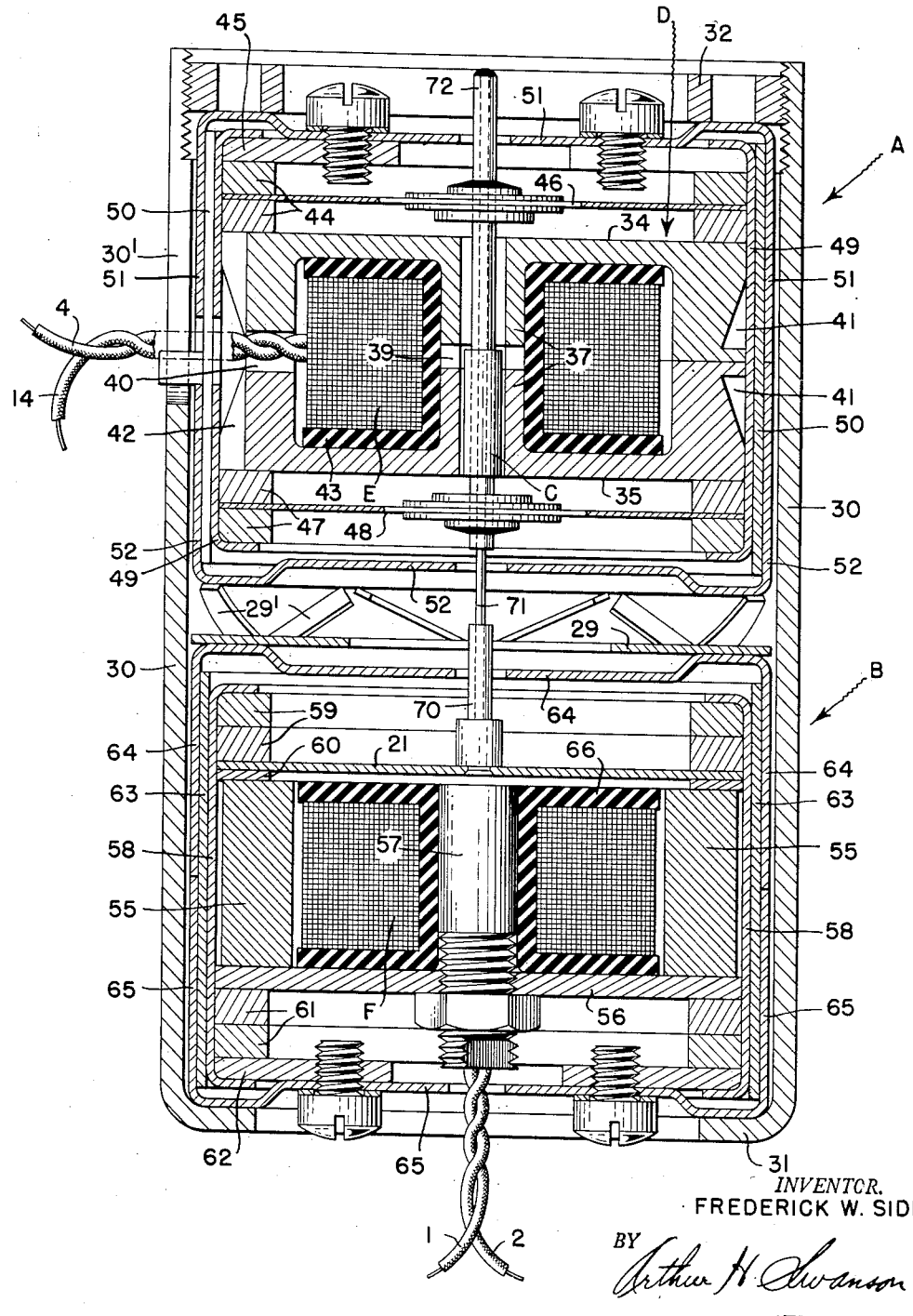
Fig. 2 is a sectional elevation of a desirable form of the converter structure shown diagrammatically in Fig. 1.
Figure 6:
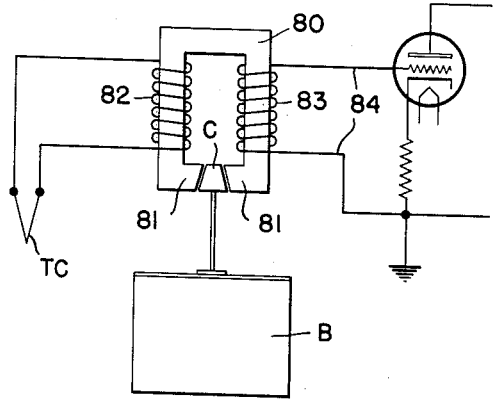
Fig. 6 is a diagrammatic representation of a modification of the apparatus shown diagrammatically in Fig. 1.

Fig. 2 illustrates a commercial form of a converter comprising modulator and driver units of the general character of the modulator and driver units A and B, respectively, which cooperate to modulate the current flow through a coil E in the manner diagrammatically illustrated in Fig. 1. In Fig. 2, the modulator and driving units A and B, with a spring washer 29 between them, are mounted in a cylindrical container sleeve or shell 30. As shown, the washer 29 is an annular spring metal part with integral uprising spring finger portions 29'. The sleeve 30 has an internal flange 31 at its lower end and is internally threaded at its other, upper end to receive an annular, externally threaded member or ring nut 32. The latter may be rotatively adjusted to compress the spring washer 29 as required to space the units A and B in the shell 30 into the desired operative relation to one another.

Figure 3:
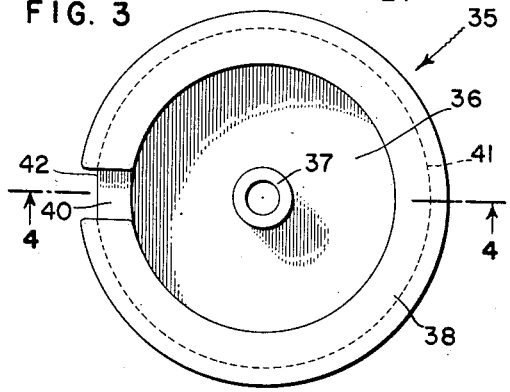
Fig. 3 is a plan view of one of the modulator pole piece parts of the Fig. 2 arrangement.
Figure 4:
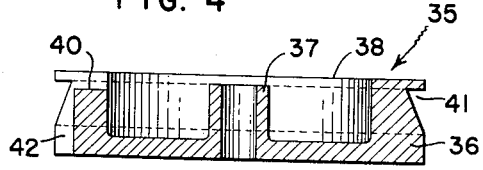
Fig. 4 is a section on the line 4—4 of Fig. 3.

As shown in Fig. 2, the pole piece structure D of the element A comprises two complementary pole piece elements 34 and 35, which may be identical in form. As shown in Figs. 3 and 4, each of the elements 34 and 35 comprises a disc-like base portion 36, a central hollow cylindrical or tubular portion 37, and an outer cylindrical portion 38. The parts 36, 37, and 38 of each pole piece element are rigidly connected and should be formed of ferrous material having a relatively high magnetic permeability. For example, the elements 34 and 35 may well be formed of the material commercially known as numetal.

In the assembled modulator unit A, the inner cylindrical portions 37 of the elements 34 and 35 are coaxial, as are the outer cylindrical portions 38 of these elements, and the abutting edges of the portions 38 may be spot welded together. The inner cylindrical portions 37 are somewhat shorter than the outer cylindrical portions 38 and thus provide a circular air gap 39 surrounding the central passage which receives the armature C.

Each of the outer cylindrical portions 38 is formed with a radial notch 40. The notches 40 in the two elements 34 and 35 are in register with one another, and collectively form a radial opening into the space enclosed by the elements 34 and 35 for the passage of the terminal conductors 4 and 14 of the solenoid winding E. Each of the elements 34 and 35 is also formed with a circumferentially extending groove 41, shown as being of triangular cross-section in Fig. 2. The ends of each groove 41 intersect a longitudinal slot 42 formed in the corresponding side of the outer cylindrical portion 38 of the corresponding one of parts 34 and 35. Each slot 42 is equal in width to the corresponding notch 40 and intersects the latter as appears clearly in Figs. 3 and 4.

The coil E is wound on a bobbin 43 of suitable non-magnetic material, such as moulded "Bakelite." The bobbin 43 is shaped to surround snugly the tubular central portions 37 of the elements 34 and 35, and the end flanges of the bobbin bear against the base portions 36 of the elements 34 and 35.

A pair of annular washers 44 is interposed between the base portion 36 of the inverted element 34 and an annular washer 45 of the same outside diameter as the washers 44 but of smaller internal diameter. The peripheral portion of a thin, flexible armature-centering disc or diaphragm 46 is clamped between the two washers 44. Two annular washers 47 are in clamping engagement with the interposed peripheral portion of a second thin, flexible armature centering diaphragm 48 located below the element 35. The washers 47 and diaphragm 48 are interposed between the base portion of the member 35 and the inturned lower end flange of a brass tube 49. The latter forms a casing body for the element A and has an inturned flange at its upper end also. The lower end flange of the casing 49 bears against the underside of the lower washer 47, and the upper flange of the casing 49 bears against the upper side of the washer 45. One of the inturned flanges of the casing 49 may be formed by a metal spinning action in a final assembly stage of the element A.

Interposed between the casing elements 30 and 49 is an inner cylindrical shielding member 50. The latter is surrounded by the cylindrical portions of two cup-shaped shield cover members 51 and 52. The end wall of the cover member 51 is secured by screws to the washer 45, and is directly engaged by the underside of the ring nut 32. The end wall of the cover member 52 engages the spring finger portions 29' of the spring washer 29. The casing 49 and shield member 50 are formed with openings which are in register with the radial opening formed by the notches 40 in the members 34 and 35, these notches opening into the space which receives the winding E. The adjacent circumferential edges of the cylindrical cover members 51 and 52 are notched to form an opening which is in register with the other openings just mentioned. A portion of the edge of the member 52 is bent outwardly below the notch therein to form a projecting key member. The outer shell member 30 is formed with a longitudinal slot 30′ extending from the upper end of the member 30 to a level below the opening formed by the notches in the cover members 51 and 52, the lower end of the slot 30′ being in register with these notches. The key member portion of the member 52 is received in the slot 30′ and hence locates the unit A within the shell 30. The terminal conductors 4 and 14 of the coil E extend through the aligned openings and notches located in the walls surrounding the solenoid winding E as above described.

The element B, in the form shown in Fig. 2, includes an annular magnetic metal body 55, a metal disc 56 of magnetic material engaging the lower end of the body 55, and a central pole piece 57 extending through a central opening in the disc 56 in threaded engagement with the latter. The element B also includes a tubular sleeve or casing 58 surrounding the body 55, a driving disc or diaphragm 21, and associated washers. The casing 58 has inturned flanges at both of its ends, one of which flanges may be formed by a spinning action in completing the assembly of the element B.

Interposed between the upper end flange of the casing 58 and the peripheral portion of the diaphragm 21 are two annular spacing washers 59. A spacing washer 60 is interposed between the diaphragm 21 and the upper face of the body 55. Interposed between the lower side of the disc 56 and the lower inturned flange of the casing sleeve 58 are two annular washers 61, which may well be identical to the washers 44, 47, and 59. The upper washer 61 engages the peripheral portion of the disc 56. Interposed between the lower washer 61 and the lower end flange of the casing 58 is a stiff metal disc or washer 62. As can be seen from Fig. 2, the assembly just described results in the diaphragm 21 being clamped between the lower washer 59 and the washer 60.

The casing 58 is surrounded by a cylindrical shield member 63 which is similar to the shield member 50. Interposed between the shield member 63 and the main container or casing 30 are the cylindrical body portions of upper and lower cup-shaped shield cover members 64 and 65. The end wall of the cover member 64 abuts against the underside of the spring washer 29, and the end wall of the cover member 65 is secured by screws to the disc 62.

The lower end portion of the pole piece 57 is suitably flattened as shown in Fig. 2 to permit the pole piece to be readily gripped for the purpose of facilitating its rotation and hence its axial adjustment within the threaded disc 56 and the body 55. This permits the distance between the upper face of the pole piece 57 and the lower side of the diaphragm 21 to be readily adjusted. Threaded onto the lower portion of the pole piece 57 is a nut which may be drawn up against the lower side of the member 56 to lock the pole piece 57 in the desired position relative to the diaphragm 21.

Although each of the pairs of washers 59 and 61 could well be a single washer of suitable dimensions, the washers 59 and 61 have been shown herein as being identical to the washers 44 and 47. This would ordinarily be done in practice for purposes of manufacturing simplicity.

The armature C of the element A is closely fitted in the passage or bore formed in the tubular portions 37 of the pole piece elements 34 and 35. The vibrating or driving connection between the armature C and the driving diaphragm 21 comprises a hollow central post 70 which is riveted or otherwise secured to the disc 21 and is formed with an upper axial passage or socket in which the lower end of a wire-like rod 71 is suitably anchored. The rod 71 extends upwardly through a tubular member 72. The latter extends between the approximate level of the upper side of the ring nut 32 and the level of the lower end of the unit A. The rod 71 fits loosely in the tube 72 and is connected concentrically to the upper end of the latter by means of soft solder. The solder connection between the rod 71 and the tube 72 is made as a preliminary assembly adjustment of the converter structure so as to anticipate the proper relation between the air gap 39, the armature C, and the driver diaphragm 21. The armature C is in the form of a sleeve which fits snugly about the tube 72 and is soft soldered thereto.

The tube 72 extends through central apertures in the centering diaphragms 46 and 48, and is rigidly connected to these diaphragms. The means for connecting the tube 72 to each centering diaphragm comprises pairs of annular clamping members which surround and are secured to the tube 72 and which are secured to the centering diaphragms 46 and 48. It is practically essential to position the tube 72 relatively to the centering diaphragms 46 and 48 so as to center the armature C accurately in the bores of the tubular parts 37. Such centering is necessary to avoid contact or lateral pressure between any longitudinal portion of the peripheral surface of the armature C and the inner wall of the bores of the tubular parts 37, and is also essential to stabilize the gain of the modulator and to minimize stray voltage and flux effects.

In the assembled apparatus, the armature should be free-floating within its vibration range, so that a free damped oscillation of the armature will be produced by tapping either end of its supporting tube 72.

The shield elements 50, 51, 52, 63, 64, and 65 are advantageously made of mumetal which is 0.025 inch thick, and are advantageously hydrifined annealed. For optimum results, all of the mumetal parts should be annealed at high temperature in a hydrogen atmosphere.

Figure 5:
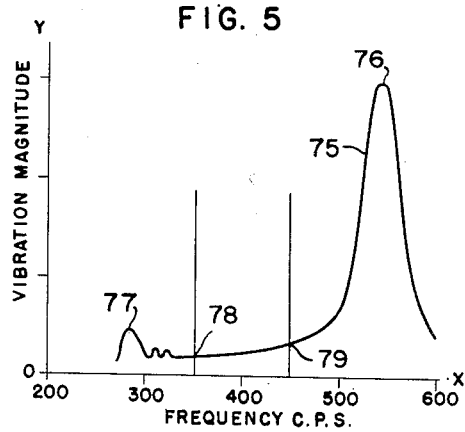
Fig. 5 is a graph illustrating desirable vibration frequency relations of the apparatus of Figs. 2 through 4.

The diaphragm 21, adapted for 400 cycle per second operation, is advantageously made from Swedish spring steel, with a finished thickness of about 0.029 inch. In practice, I have found it essential to construct and calibrate the converter so that its operating frequency of 400 cycles per second or thereabouts is definitely lower than the natural mechanical vibration frequency of the armature, and is definitely larger than the second subharmonic of the last mentioned frequency. Vibration frequency relations of the preferred apparatus illustrated in Fig. 2 are shown in Fig. 5, wherein vibration magnitude for the armature C has been plotted against vibration frequency. In Fig. 5, the point 76 on the curve 75 represents the resonance pip developed when the armature is vibrating at its natural mechanical vibration frequency, and the point 77 represents the vibration magnitude when the vibration frequency is that corresponding to the second subharmonic of the natural mechanical vibration frequency. With the conditions indicated by the curve 75, the maximum or resonance vibration magnitude is seen to occur when the vibration frequency is approximately 540 cycles per second, and the second harmonic peak is seen to occur when the vibration frequency is somewhat less than 290 cycles per second.

As indicated by the portion of the curve 75 between the points 78 and 79, the operation of the vibratory element of the converter shown in Fig. 2 will be quite stable when the vibration frequency lies between the frequencies represented by the last mentioned points. This stable range is substantial, since the point 78 corresponds to a vibration frequency of 350 cycles per second, while the point 79 corresponds to a vibration frequency of 450 cycles per second. It is believed to be possible to increase the stable frequency range by increasing the thickness of the driving diaphragm 21. It is to be noted, however, that such an increase in thickness would apparently be limited by certain adverse effects which would result therefrom. Those effects are:

1. Increased power input would be required to vibrate the thickened diaphragm;
2. An increase in A. C. strays would result from the stronger magnetic field required;
3. An increase in the driver coil temperature would result;
4. Expansion of vibrator component parts might, by a change in adjustment, affect the efficiency of the converter; and
5. The thickened diaphragm would be difficult to pierce.

The energizing coil F for the driver unit B is wound on a suitable bobbin, which may be similar to that on which the coil E is wound. The bobbin for the coil F is positioned concentrically on the member 56, and surrounds the pole piece 57. The leads 1 and 2 for the coil F pass through a suitable opening, not shown, in the member 56, and then pass through aligned openings in the members 62, 65, and 30 as shown in Fig. 2.

For maximum coupling efficiency between the modulator unit and the remainder of the associated apparatus, and particularly between the modulator unit and the transformer TR of Fig. 1, the impedances of the modulator unit and transformer should be matched. To that end, I believe the input transformer of the amplifier should have a single primary winding wound to match the modulator impedance. The impedance of a working model of the modulator A which I have constructed is approximately 300 ohms in operation at 400 cycles per second, and the coil E thereof has a D. C. resistance of about 45 ohms and is formed of No. 33 B. & S. gauge copper wire covered with a suitable insulating material.

My novel inductance or variable reluctance type of converter can take various forms, some of which are illustrated diagrammatically in Figs. 6, 7, 8, and 9. In the modification shown in Fig. 6, I make use of a mu-metal magnet 80, in the form of an enlongated U, and an armature C vibrated by a driver element B to increase and decrease alternately the air gap between the armature and the adjacent ends 81 of the magnet 80. In the arrangement shown in Fig. 6, the thermocouple TC or other source of direct current is connected in series with a coil 82 surrounding one leg of the magnet 80. A second winding 83, surrounding the second leg of the magnet 80, has its terminals connected to the input terminals 84 of an electronic amplifier, only partially shown in Fig. 6. With a D. C. voltage impressed on the terminals of the coil 82, the variations in the air gap produced by the vibration of the armature C will generate an alternating current in the winding 83, and thus will cause an alternating current signal to be applied to the amplifier input terminals 84.

Figure 7:
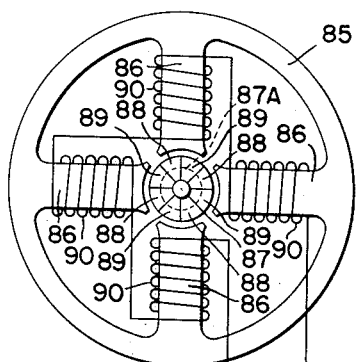
Fig. 7 is a diagrammatic illustration of a converter including a rotating element.

The arrangement shown in Fig. 7 comprises an electromagnetic structure in the form of a ring-shaped yoke 85 and four pole pieces 86 extending radially inward toward the axis of the yoke, and spaced 90° apart around an armature 87 which is adapted to be rotated about said axis with a velocity depending upon the desired modulation frequency. The armature may be rotated by any suitable means, such, for example, as a synchronous alternating current motor 87A having its shaft in alignment with and directly connected to the shaft of the armature 87. The latter comprises magnetic segments 88 alternating with non-magnetic segments 89. The pole pieces 86 are surrounded by coils or windings 90, each of which is included in a series circuit 91 including a thermocouple TC or other source of a small unidirectional voltage. Said series circuit also includes the primary winding of a transformer 92 which may serve to couple the circuit 91 to an amplifier AMP and thereby to measuring apparatus of any suitable type.

As the armature 87 of Fig. 7 is rotated, the reluctances of the separate magnetic paths, each including a pair of the pole pieces 86 at right angles to one another, are successively decreased and increased. This has the effect of producing an alternating current in the secondary of the transformer 92 which is proportional in magnitude to the thermocouple voltage.

Figure 8:
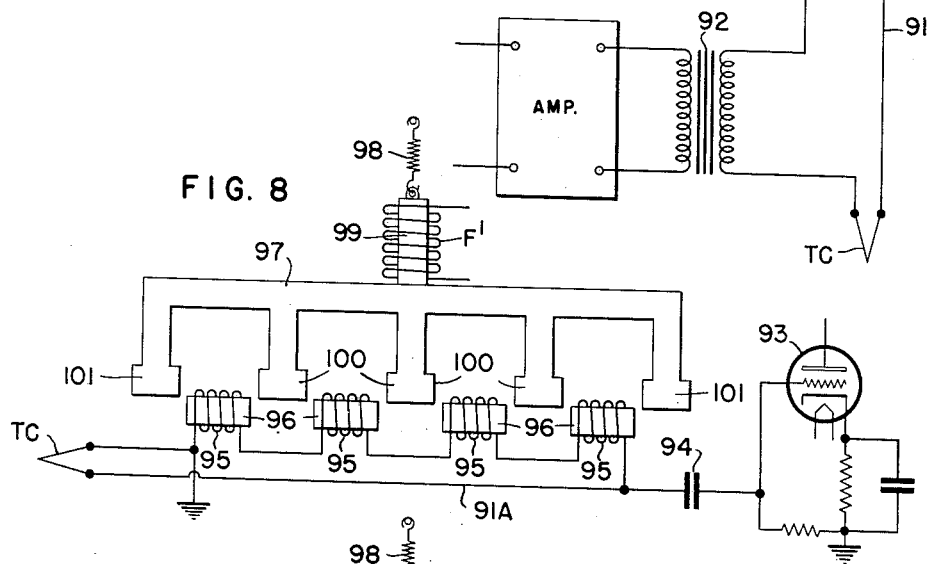
Figs. 8 and 9 illustrate two other embodiments of the present invention.

In the arrangement shown diagrammatically in Fig. 8, a series circuit 91A, analogous to the circuit 91 of Fig. 7, is arranged to impress a modulated, alternating voltage on the input circuit of an amplifier valve 93 through a coupling condenser 94. The circuit 91A includes a thermocouple TC, and also includes a series of similarly wound coils 95, each of which surrounds a core 96 of magnetic material. As diagrammatically shown, the cores 96 are arranged end-to-end, but are spaced apart to provide air gaps which are effectively increased and decreased by the vibratory movements of a vibrating magnetic structure. The latter is shown as including a yoke member 97 suspended by a spring 98 and given vibratory movements by means of an armature 99 having one end connected to the yoke member 97 and extending at right angles to the latter. The armature 99 is surrounded by a coil F′, which may be like the coil F of Fig. 1 and which has its terminals connected to a source of alternating current of the desired frequency. The yoke member 97 supports and gives vibratory movements to three pole pieces 100 which are connected to and extend perpendicularly away from the underside of the yoke 97.

The up and down vibratory movements of the pole pieces 100, produced by the energization of the coil F′, alternately decrease and increase the air gaps between the different cores 96. The yoke 97 is also provided at its ends with pole pieces 101 which alternately decrease and increase the air gaps between those pole pieces and the ends of the cores 96 which are at the opposite ends of the row of cores 96. As will be apparent, vibratory movements given to the pole pieces 100 and 101 will modulate the direct currents generated by the thermocouple TC and will thus cause an alternating current signal to be impressed on the input circuit of the amplifier valve 93.

Figure 9:
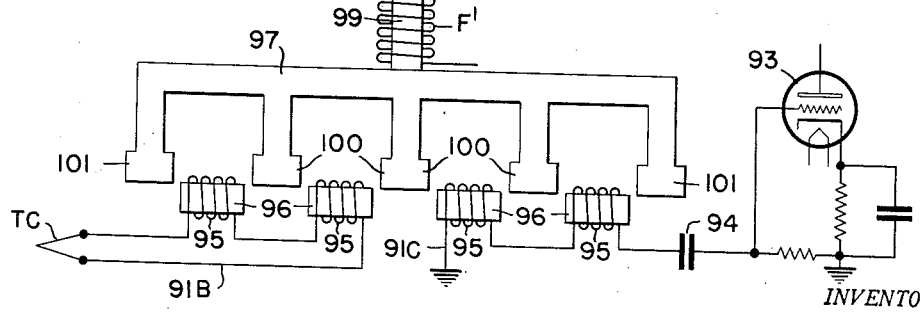

The embodiment of the invention shown in Fig. 9 differs from that shown in Fig. 8 by the replacement of the single circuit 91A of Fig. 8 by two circuits 91B and 91C. In the particular arrangement illustrated in Fig. 9, the circuit 91B includes the thermocouple TC and two adjacent windings 95, one of the cores 96 of the last mentioned windings having one end adjacent one of the pole pieces 101. The circuit 91C includes the other two windings 95, which are shown as connected in series between the input terminals of the amplifier valve 93. In the arrangement shown in Fig. 9, the circuits 91B and 91C are inductively coupled by the central pole piece 100, the two cores 96 adjacent and at opposite sides of said central pole piece, and the windings 95 surrounding the last mentioned two cores. The operation of the apparatus shown in Fig. 9 is substantially equivalent to that of the apparatus shown in Fig. 8.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A converter unit comprising in combination, a modulating element including an electro-magnet having a core structure including coaxial disc-like end portions and a hollow axial portion including juxtaposed tubular projections from said end portions with their adjacent ends separated by an air gap, an armature extending into and movable back and forth in said axial portion to thereby alternately increase and decrease the core structure reluctance due to said air gap, a modulator winding surrounding said axial core portion, an electro-magnetic vibrator element comprising a second core structure having a central polar portion coaxial with said axial portion, an energizing winding surrounding said polar portion and having terminals for connecting the last mentioned winding to a source of alternating current, and a magnetic body adjacent one end of said polar portion and connected to said armature to give reciprocatory movements of predetermined frequency to said armature when alternating current flows through said energizing winding.

2. A converter unit as specified in claim 1, wherein said armature is coaxially mounted within one of said tubular projections for reciprocating movement of one end of said armature in said air gap, whereby the reciprocatory movements imparted to said armature by said vibrator element cause said armature to vary the reluctance of the first mentioned core structure due to said air gap.

3. A converter as specified in claim 1, wherein said modulating element includes means supporting said armature for said movement back and forth in said axial portion of the first mentioned core structure, and wherein said supporting means comprises flexible diaphragms coaxial with and at opposite ends of said first mentioned core structure, each of said diaphragms having a central portion connected to said armature, and having an outer portion rigidly supported relative to said first mentioned core structure.

4. A converter as specified in claim 1, wherein said disc-like end portions comprise two cup-shaped bodies of magnetic material having their rim edges in abutting relation.

5. A converter as specified in claim 1, wherein said predetermined frequency is intermediate the natural vibration frequency of said armature and the second subharmonic of said natural vibration frequency.

6. A converter as specified in claim 1, wherein said modulator winding comprises a single coil portion surrounding said tubular projections and having terminals adapted to be connected in a series circuit with the input circuit of an amplifier and a pair of terminals adapted to be connected to a source of a small unidirectional voltage.

7. A converter as specified in claim 1, wherein said modulator winding comprises two coil portions, wherein one of said coil portions has terminals adapted to be connected to a source of a small unidirectional voltage, and wherein the other of said coil portions has terminals adapted to be connected to the input circuit of an amplifier.

8. A converter unit as specified in claim 1, including a metallic shell in which said modulating and vibrator elements are mounted.

9. A converter unit as specified in claim 1, including a metallic shell with internal end flanges surrounding said modulating and vibrator elements, and resilient means interposed between said elements and pressing each of said elements against the adjacent end flange.

10. A converter unit comprising in combination, a modulator element including an electro-magnet having a core structure including coaxial disc-like end portions and an axial central portion including juxtaposed tubular projections from said end portions with their adjacent ends separated by an air gap, a cylindrical armature extending into and axially movable back and forth in said axial portion to thereby alternately increase and decrease the core reluctance due to said air gap, a modulator winding surrounding said central core portion, an electro-magnetic vibrator element coaxial with said core structure and comprising a second structure including a central polar portion coaxial with said armature, an energizing winding surrounding said polar portion and having terminals for connection to a source of alternating current, and a magnetic body adjacent one end of said polar portion and connected to said armature and operative to give reciprocatory movement to said armature when alternating current flows through said energizing winding.

11. A converter unit as specified in claim 10, in which said magnetic body is a permanent magnet.

12. A converter unit as specified in claim 10, in which said magnetic body is a disc having a stationary peripheral portion and a vibratile central portion.

13. A converter unit as specified in claim 10, in which each of said elements is mounted in a separate tubular container having inwardly projecting end flanges.

14. A converter unit as specified in claim 10, which includes a cylindrical metallic shell, and in which each of said elements is a self-contained, cylindrical structure mounted with the other element in said shell in end to end relation.

15. A converter unit as specified in claim 14, in which said shell includes internal end flanges, and said unit includes a spring washer interposed between said elements resiliently pressing each element against the adjacent end flange.

16. A converter unit as specified in claim 10, which includes a cylindrical metallic shell and in which each of said elements is a self-contained cylindrical structure which includes a metallic shield casing having a hollow cylindrical body and end portions with central apertures, and in which said elements are mounted in end to end relation in said shell.

17. A converter unit as specified in claim 16, in which said shield casing comprises two cup shaped members with their respective end walls at the outer sides of the end flanges of the corresponding cylindrical structure, and with their body portions in telescopic relation.

References Cited in the file of this patent

UNITED STATES PATENTS

| | | |
|---|---|---|
| 1,891,156 | Harrison | Dec. 3, 1932 |
| 1,943,463 | Van Ohlsen et al. | Jan. 16, 1934 |
| 2,025,315 | Stansburg | Dec. 24, 1935 |
| 2,148,718 | Agins | Feb. 28, 1939 |
| 2,330,526 | Sorenson | Sept. 28, 1943 |
| 2,342,628 | Ejeven et al. | Feb. 29, 1944 |
| 2,430,757 | Conrad et al. | Nov. 11, 1947 |
| 2,442,560 | Finch | June 1, 1948 |
| 2,469,137 | Strong | May 3, 1949 |
| 2,493,669 | Gray | Jan. 3, 1950 |
| 2,494,579 | Pimlott | Jan. 17, 1950 |
| 2,598,232 | Dawson | May 27, 1952 |
| 2,658,173 | Reese | Nov. 3, 1953 |